United States Patent [19]
Kanawa

[11] 3,775,718
[45] Nov. 27, 1973

[54] PLURAL-PART PROTECTIVE CASING FOR SOLENOID ASSEMBLY

[75] Inventor: Haruo Kanawa, Fujisawa, Japan

[73] Assignee: Yuken Kogyo Company Ltd., Fujisawa-shi, Japan

[22] Filed: Nov. 18, 1971

[21] Appl. No.: 199,871

[30] Foreign Application Priority Data
Nov. 20, 1970 Japan.............................. 45/101907

[52] U.S. Cl............................ 335/278, 206/DIG. 33
[51] Int. Cl................................................ H01f 7/00
[58] Field of Search.................... 335/202, 260, 278; 206/46 FR, 46 H, DIG. 33; 336/90

[56] References Cited
UNITED STATES PATENTS
3,209,096  9/1965  Reiner et al. .................. 335/202 X FOREIGN PATENTS OR APPLICATIONS
945,183  12/1963  Great Britain.................. 206/46 FR Primary Examiner—George Harris
Attorney—Steinberg & Blake

[57] ABSTRACT

The solenoid assembly of this invention is so designed and arranged that it can be assembled by enclosing an electromagnetic device of the solenoid assembly consisting of coil, core, plunger and the like in a retainer casing made of resilient material, and by accommodating the assembly thus assembled in a cover in its entirety. Thereby, the solenoid assembly is easily assembled and dismantled. Mechanical shocks that may be caused during operation of the electromagnetic device can be absorbed by the resilient material, noises being lessened, and simultaneously the durability of the overall assembly can be remarkably improved.

7 Claims, 7 Drawing Figures ary space for housing an electromagnetic means or device B of the solenoid assembly and a retainer casing means C for said device made from resilient material.

PLURAL-PART PROTECTIVE CASING FOR SOLENOID ASSEMBLY

This invention relates to a solenoid assembly so designed and arranged that it can be assembled by enclosing an electromagnetic device of the solenoid assembly consisting of coil, core, plunger and the like in a retainer casing made of resilient material, and by accommodating the thus resulted assembly in a cover in its entirety.

The conventional solenoid assembly is so constituted that an electromagnetic device thereof, consisting of a coil, a core, a plunger and so forth is secured to a metal plate and enclosed in a cover which is then secured to said metal plate, or that the electromagnetic device enclosed within a cover is maintained in position therein under resilient pressure exerted by a spring or other resilient means. This conventional solenoid assembly had a drawback that the assembly and dismantling thereof are performable only with considerable difficulty.

The present invention is aimed at the elimination of these deficiencies inherent in the conventional construction. According to the present invention, the electromagnetic components such as core, coil, plunger and so forth are retained by a retainer element made from resilient material and enclosed in a cover, so that the assembly and dismantling operations are performable without any difficulty. According to the present invention, any mechanical shocks that may be generated during operation of the electromagnetic device can be absorbed by the resilient material, and the noises can also be lessened, at the same time that the durability of the overall assembly can be outstandingly improved. Moreover, the heat generated in the coil can be dissipated in a satisfactory way by virtue of the thermal conductivity of the resilient material.

The present invention will now be explained in detail by referring to the accompanying drawings.

In the accompanying drawings showing certain embodiments of the present invention;

Figure 3:
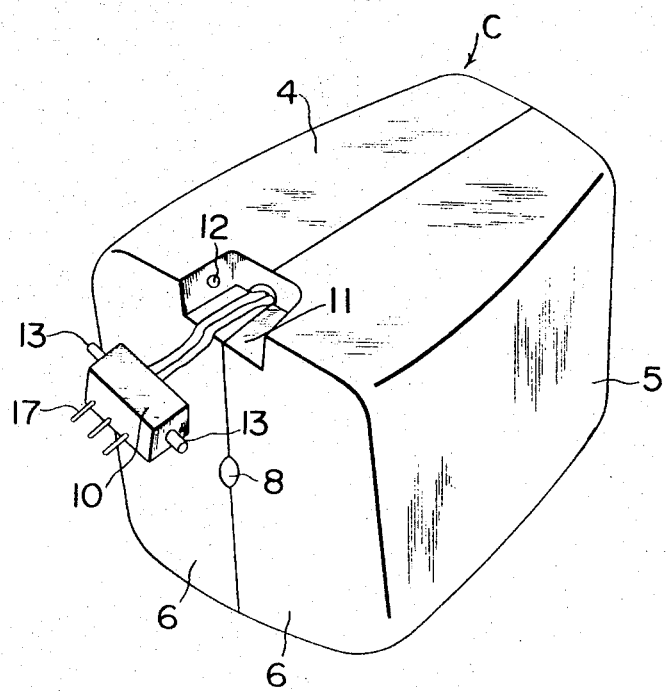
Figure 4:
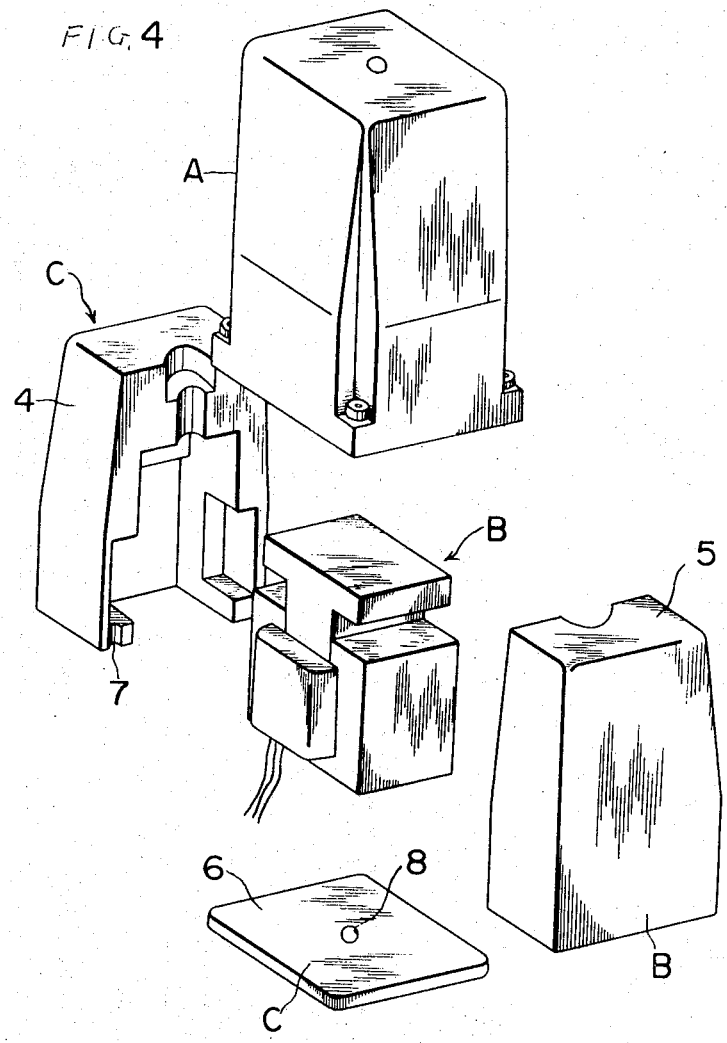
Figure 5:
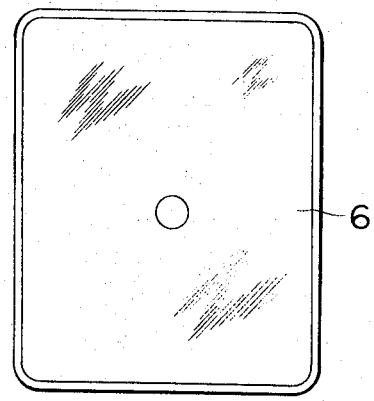
Figure 6:
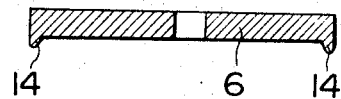
Figure 7:
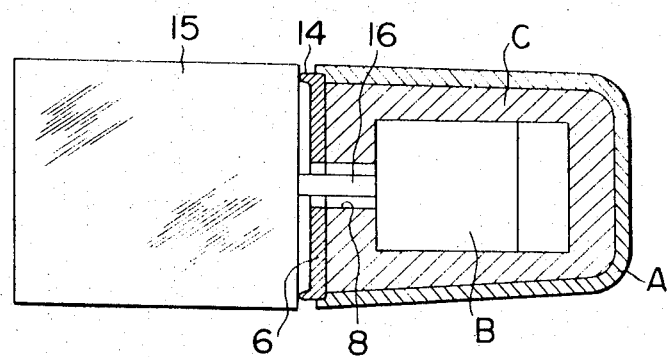

FIG. 3 is a perspective view showing the assembled state of the second embodiment, FIG. 4 is an exploded perspective view of the third embodiment, FIG. 5 is a plan view of the bottom plate used in the third embodiment, FIG. 6 is a longitudinal sectional view of the bottom plate of the third embodiment, and FIG. 7 is an explanatory view, in side elevation, showing the state of engagement between the valve body and the electromagnetic device.

FIRST EMBODIMENT

Figure 1:
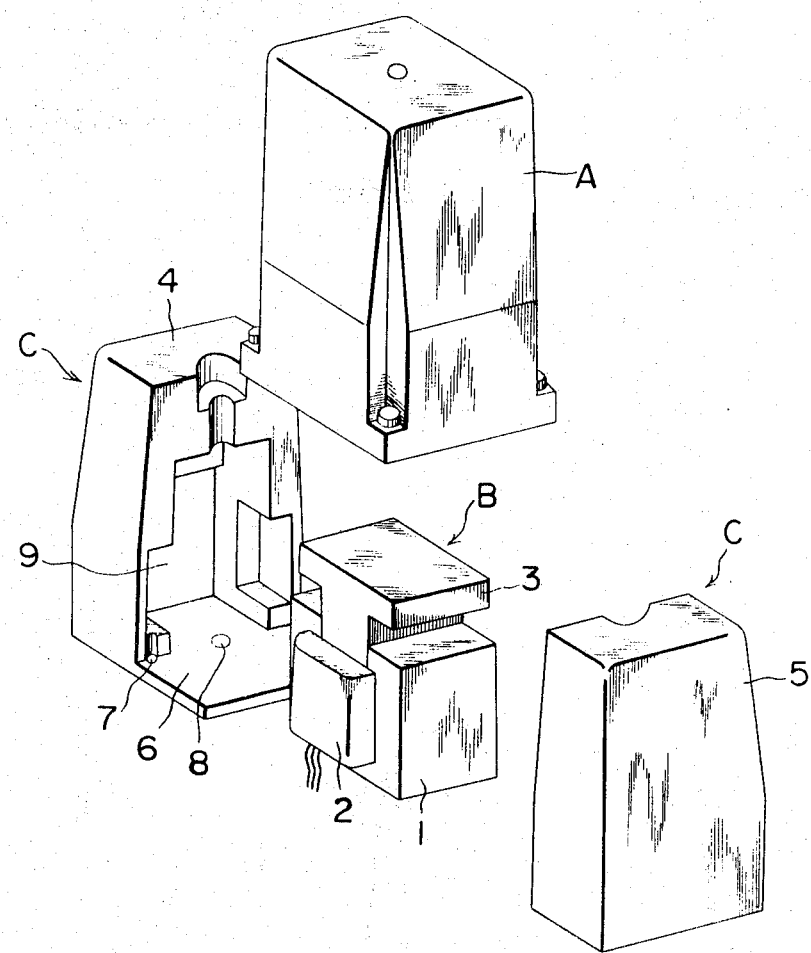
FIG. 1 is an exploded perspective view of the first embodiment.

Referring now to FIG. 1, A denotes a cover with an internal space for housing an electromagnetic means or device B of the solenoid assembly and a retainer casing means C for said device made from resilient material.

Said electromagnetic device B comprises a core 1, a coil 2 and a plunger 3. The latter is moved axially under the magnetic force generated by the energization of coil 2, thus causing the spool, not shown, of a valve to be moved therewith.

The retainer casing C is prepared from resilient material such as rubber and synthetic resin and split along its center line into two blocks or segments 4, 5, defining in this way an internal space 9 for housing said device B. The one segment 4 of the retainer casing C is formed integrally with a bottom plate 6. It will be readily realized that the device B can be incorporated into the retainer casing C by accommodating the latter into said segment 4 and applying the remaining segment 5 thereto. Then, the assembly thus prepared is housed in its entirety into the cover A. The bottom of the cover A is closed at this time by the bottom plate 6. Thus, the assembly and dismantling operation of the overall assembly are attainable in a highly simplified way.

Numeral 7 denotes an opening for passage of a lead wire, and numeral 8 denotes an opening for passage of a push pin 16 (FIG. 7) abutting at one end on the plunger 3 and engaging at the other with a valve spool, not shown.

SECOND EMBODIMENT

Figure 2:
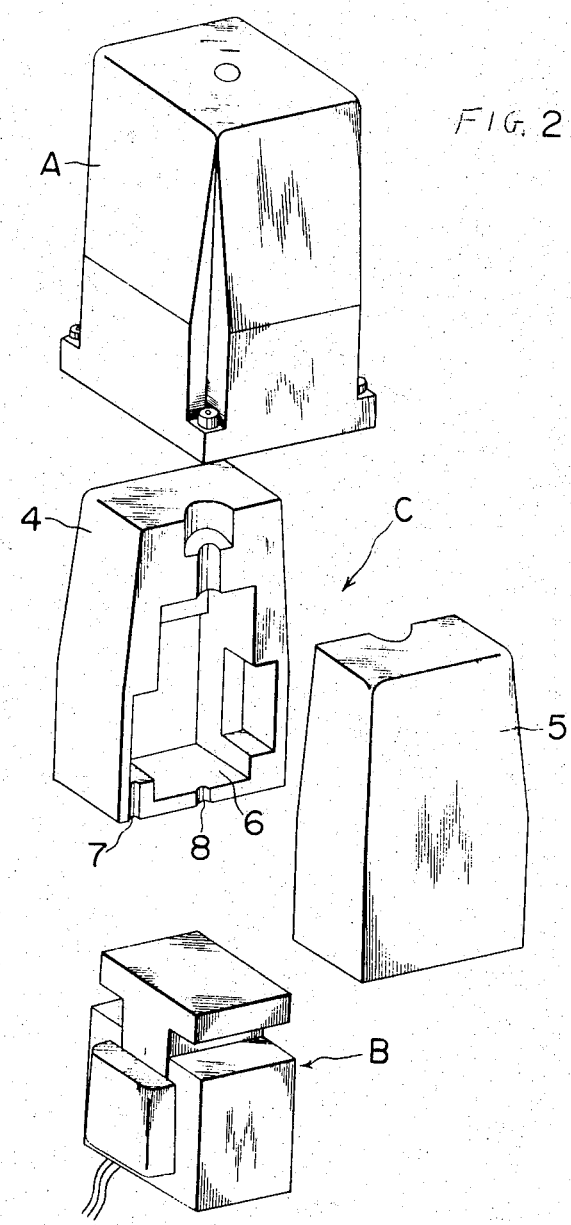
FIG. 2 is an exploded perspective view of the second embodiment.

The construction of the second embodiment shown in FIGS. 2 and 3 is the same as that of the preceding embodiment, except that the bottom plate 6 of the retainer casing C is divided along the center line and formed integrally with the two portions 4, 5, and that a recessed part 11 is formed on some portion of the casing C for the mounting of an electrical connector 10 therein. Blind holes 12 are formed on two opposing faces of the recessed part 11. The connector 10 is housed within the recessed part 11 with its dowel pins 13 snugly received into said blind holes 12, and the entire assembly including the connector 10 thus housed within the recessed part is then accommodated into the cover A. The recessed part 11 for housing the electrical connector can naturally be formed on the retainer casing C of the preceding embodiment and the third embodiment to be described hereafter. The connector or plug 10 has prongs 17 to be received in mating recesses of a plug.

THIRD EMBODIMENT

FIGS. 4 to 6 illustrate the detailed construction of the third embodiment. In the present embodiment, the bottom plate 6 is separated physically from the segments 4, 5, thus the retainer casing C being comprised of the three component elements, namely the segments 4, 5 and the bottom plate 6. Other details of construction of the present embodiments are the same as those of the preceding embodiments.

Along the peripheral part of the lower surface of the bottom plate 6, there is formed a pointed rib 14. When the retainer casing C is housed within cover A and the bottom plate is then fitted to the opened bottom part of the cover A, this rib 14 will be brought into abutment with the valve body 15 shown in FIG. 7, thus assuring a tight seal against the outside.

Since the solenoid assembly according to the present invention has the above-mentioned construction, it can be assembled and dismantled without much difficulty. Moreover, the component elements such as core and coil are enclosed within a retainer element made of resilient material and accommodated in turn in a cover member, any mechanical shocks that may be generated during operation of the electromagnetic device can be absorbed by the shock absorbing action of the resilient material, and the noises can also be lessened, at the same time that the durability of the overall assembly can also be improved. In addition, since the internal space of the assembly can be lessened and the heat generated in the coil can be dissipated satisfactorily by virtue of the thermal conductivity of the resilient material, the operational efficiency of the solenoid assembly can be enhanced considerably.

What we claim is:

1. In a solenoid assembly, electromagnet means having a coil and core and an armature which is movable with respect to said coil and core, retainer casing means for directly supporting said electromagnet means, said retainer casing means including at least a pair of resilient blocks engaging each other and having a configuration according to which said blocks define a hollow interior space in which said electromagnet means is accommodated with said blocks directly engaging and supporting said electromagnet means for absorbing shocks and dissipating heat therefrom.

2. The combination of claim 1 and wherein said retainer casing means has an exterior portion formed with a recess, an electrical connector situated in said recess and having a conductor connected to said coil of said electromagnet means.

3. The combination of claim 1 and wherein a hollow housing means has an interior space whose configuration conforms to the exterior of the assembled blocks, said hollow housing means receiving in its interior said blocks of said retainer casing means and said hollow housing means holding said blocks together so that through said housing means said blocks of said retainer casing means are maintained in assembled condition supporting said electromagnet means for operation, said housing means being open at one end, and a closure means closing said housing means at said open end thereof.

4. The combination of claim 3 and wherein said closure means forms part of at least one of said blocks.

5. The combination of claim 3 and wherein said closure means has portions respectively forming parts of both of said blocks.

6. The combination of claim 3 and wherein said closure means consists of a separate closure plate separate from said blocks and closing said open end of said housing means.

7. The combination of claim 6 and wherein a valve means is operatively connected with said electromagnet means and is situated adjacent said closure plate, the latter having a peripheral lip directly engaging said valve means to form a fluid-tight connection therewith.

* * * * *